United States Patent
Hallenstvedt et al.

(10) Patent No.: US 6,763,787 B2
(45) Date of Patent: Jul. 20, 2004

(54) DEVICE FOR CONTROLLING THE PHASE ANGLE BETWEEN A FIRST AND A SECOND CRANKSHAFT

(75) Inventors: Oddbjörn Hallenstvedt, Valskog (SE); Bo Kristiansson, Kungsör (SE); Stefan Nilsson, Köping (SE); Anders Rydberg, Arboga (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/065,973

(22) Filed: Dec. 5, 2002

(65) Prior Publication Data

US 2003/0111028 A1 Jun. 19, 2003

Related U.S. Application Data

(63) Continuation of application No. PCT/SE01/01233, filed on Jun. 1, 2001, now abandoned.

(30) Foreign Application Priority Data

Jun. 5, 2000 (SE) .............................................. 0002088

(51) Int. Cl.[7] .............................................. F02B 75/04
(52) U.S. Cl. .................................. 123/78 A; 123/78 D
(58) Field of Search ......................... 123/90.15, 90.27, 123/90.32, 48 D, 73 AE, 48 A, 78 D, 78 A

(56) References Cited

U.S. PATENT DOCUMENTS

| | | | | |
|---|---|---|---|---|
| 4,104,995 A | * | 8/1978 | Steinbock | 123/78 D |
| 4,481,912 A | * | 11/1984 | Stwiorok et al. | 123/90.15 |
| 4,577,598 A | * | 3/1986 | Ma | 123/90.15 |
| 4,625,684 A | * | 12/1986 | Van Avermaete | 123/48 D |
| 5,188,066 A | * | 2/1993 | Gustavsson | 123/48 A |
| 5,494,008 A | * | 2/1996 | Ohkawa et al. | 123/90.15 |
| 6,199,522 B1 | * | 3/2001 | Regueiro | 123/90.15 |
| 6,216,654 B1 | * | 4/2001 | Regueiro | 123/90.15 |
| 6,260,520 B1 | * | 7/2001 | Van Reatherford | 123/48 A |
| 6,318,314 B1 | * | 11/2001 | Otto et al. | 123/90.15 |
| 6,352,060 B1 | * | 3/2002 | Bentley | 123/90.15 |
| 6,415,753 B1 | * | 7/2002 | Nagaosa et al. | 123/90.15 |
| 6,425,357 B2 | * | 7/2002 | Shimizu et al. | 123/90.15 |

* cited by examiner

*Primary Examiner*—Henry C. Yuen
*Assistant Examiner*—Jason Benton
(74) *Attorney, Agent, or Firm*—Novak Druce LLP

(57) ABSTRACT

Method and device for regulating the phase angle between a first and a second crankshaft of an internal combustion engine. The engine includes primary cylinders that communicate with secondary cylinders and in every primary cylinder there is movably arranged a primary piston that is connected to the first crankshaft and in every secondary cylinder there is movably arranged a secondary piston that is connected to the second crankshaft. The first and second crankshafts are connected to each other by means of a transmission adapted with the device that includes a crankshaft extension for obtaining the control of the phase angle, the extension being fixed against rotation and displaceably connected to one of the crankshafts and via a grooved portion rotationally connected to the second of the crankshafts. When the crankshaft extension in displaced, rotation is obtained in the grooved portion that results in a corresponding phase angle shift.

10 Claims, 2 Drawing Sheets

DEVICE FOR CONTROLLING THE PHASE ANGLE BETWEEN A FIRST AND A SECOND CRANKSHAFT

CROSS REFERENCE TO RELATED APPLICATIONS

This application is a continuation patent application of International Application No. PCT/SE01/01233, filed Jun. 1, 2001 now abandoned, which was published in English pursuant to Article 21(2) of the Patent Cooperation Treaty, and which claims priority to Swedish Application No. 0002088-3, filed Jun. 5, 2000. Both applications are expressly incorporated herein by reference in their entireties.

BACKGROUND OF INVENTION

1. Technical Field of the Invention

The present invention relates to a device for controlling the phase angle between a first and a second crankshaft of an internal combustion engine of the type that includes at least one primary cylinder that communicates with at least one secondary cylinder. A primary piston is normally included that is movably arranged in each primary cylinder and is connected to the first crankshaft. In every secondary cylinder, there is a secondary piston movably arranged that is connected to the second crankshaft. The first and second crankshafts are typically connected to each other by means of a transmission and a means or mechanism for obtaining a phase shift control. A crankshaft extension is also provided for the phase angle control, and which is fixedly connected against relative rotation to one of the crankshafts, and rotationally connected to the second of the crankshafts.

2. Background Art

In internal combustion engines of the piston type, for example Otto engines and diesel engines with one or several cylinders with pistons reciprocating therein, a fuel air mixture is compressed in a combustion chamber, where it is ignited and burnt when the piston is in its uppermost position.

The compression of the fuel air mixture is determined by the compression ratio of the particular engine in question, a parameter that is defined as the ratio between the volume in the cylinder when the piston is in its lowest and uppermost positions. Modern Otto engines usually have a compression ratio around 10:1 (compression FIG. 10), while supercharged engines, for example turbo engines, have a lower ratio and diesel engines have a considerably higher compression ratio. The compression ratio of the engine affects the combustion of the fuel air mixture.

A high compression contributes to an effective combustion, which in turn contributes to a high efficiency and low fuel consumption. At the same time, however, there is a need for using high octane fuel, particularly in the case of high engine loads in order to avoid uncontrolled combustion. In view of this background, it becomes evident that it can be desirable to be able to vary the compression ratio during engine operation depending on fuel quality and engine load.

U.S. Pat. No. 5,638,777 discloses an internal combustion engine with a variable compression ratio. The engine has a number of primary cylinders and a corresponding number of secondary cylinders which each communicates with a corresponding primary cylinder. In each primary cylinder, a primary piston is connected to a first crankshaft and is arranged to carry out back and forth movement. In a corresponding way, in each secondary cylinder there is a secondary piston connected to a second crankshaft, the secondary piston also being arranged to carry out back and forth movement. Between the first and second crankshafts, there is arranged a gear wheel transmission and a device for phase angle shift between the shafts, with the purpose of obtaining a compression ratio that depends on the current load of the engine. The device includes a driving shaft fixedly connected to the second crankshaft, and which is equipped with spiral-shaped splines concentrically arranged inside an outer casing. The outer casing exhibits a first gear wheel intended to interact with a second gear wheel arranged on the first crankshaft, and that has internal spiral-shaped splines. Between the outer casing and the drive shaft, there is arranged a displaceable pipe element, the enveloping surface of which is equipped with spiral-shaped splines intended to cooperate with the internal spiral-shaped splines of the outer casing. The pipe element is, in addition, equipped with internal spiral-shaped splines that cooperate with the spiral-shaped splines arranged on the drive shaft. In the case of axial displacement of the pipe element, for example in the case of a hydraulic control system, a phase angle shift is obtained between the first gear wheels and the drive shaft, and thus also between the first and second crankshafts.

Although the device exhibited in U.S. Pat. No. 5,638,777 enables good control of the phase shift between the crankshafts, it does have certain drawbacks. One drawback is that it is relatively expensive to manufacture it, since it is relatively complex in its design, especially concerning the displaceable pipe element, which is equipped both on the enveloping surface and internally with spiral-shaped splines. Another drawback is that the pipe element, including the hydraulic control system, needs a relatively large accommodating space in its axial direction. This makes it difficult to install it in cars with lateral multi-cylinder engines. Furthermore, assembly/disassembly of this device is relatively difficult to carry out.

SUMMARY OF INVENTION

An object of the present invention is to provide a device for controlling the phase angle between a first and second crankshaft of an internal combustion engine, which, relative to previous technology, is more cost efficient to manufacture.

In an exemplary embodiment, such a device includes at least one primary cylinder which communicates with at least one secondary cylinder and which has a primary piston that is movably arranged in that primary cylinder. The primary piston being connected to the first crankshaft, and in every secondary cylinder there is movably arranged a secondary piston that is connected to the second crankshaft. The first and second crankshafts are connected to each other by means of a transmission and the device further includes means for obtaining the phase shift control and a crankshaft extension intended for such phase control. The extension is connected fixed against rotation to one of the crankshafts, and rotationally fixed to the other of the crankshafts. By means of the crankshaft extension being displaceably arranged relative to one of the crankshafts, a mechanical interface is obtained at which phase angle shift can be done without introducing further components.

According to a preferred embodiment, the inventive means or arrangement is configured to bring about axial displacement of the crankshaft extension, and as a result of which the phase angle will shift. The means or arrangement preferably consists of a hydraulic piston arranged in a housing for affecting the crankshaft extension in at least one direction. This enables quick phase angle shift with good precision at high engine loads.

According to another preferred embodiment, the hydraulic piston is also arranged to affect crankshaft extension in a second direction, to enable optimal control of the phase angle between the first and second crankshaft, for example in the case of rapid shifts in engine load.

Since the hydraulic piston according to the present invention is arranged to not rotate relative to the housing, a simplified oil sealing is obtained between the piston and the housing. Furthermore, this creates favorable conditions for obtaining a simple and durable arrangement for supplying oil to the piston.

In another preferred embodiment of the invention, the crankshaft extension, at one end, is equipped with splines that enable a displaceable connection, fixed against rotation, to one of the crankshafts. The crankshaft extension is, additionally, at its other end, equipped with a grooved portion, preferably trapeze grooves, for the rotatable connection.

By providing the crankshaft extension according to the present invention with a flange between the spline-equipped portion and the grooved portion which the hydraulic piston is arranged to affect, a compact and axially short device for controlling the phase angle is enabled; an attribute that is extremely advantageous in most motor vehicles.

Other advantages and objects of the invention can be found in the appended claims and in the description below.

BRIEF DESCRIPTION OF DRAWINGS

The invention will, in the following, be described in connection with examples of preferred embodiments and with respect to the appended figures in which.

DETAILED DESCRIPTION

Figure 1:
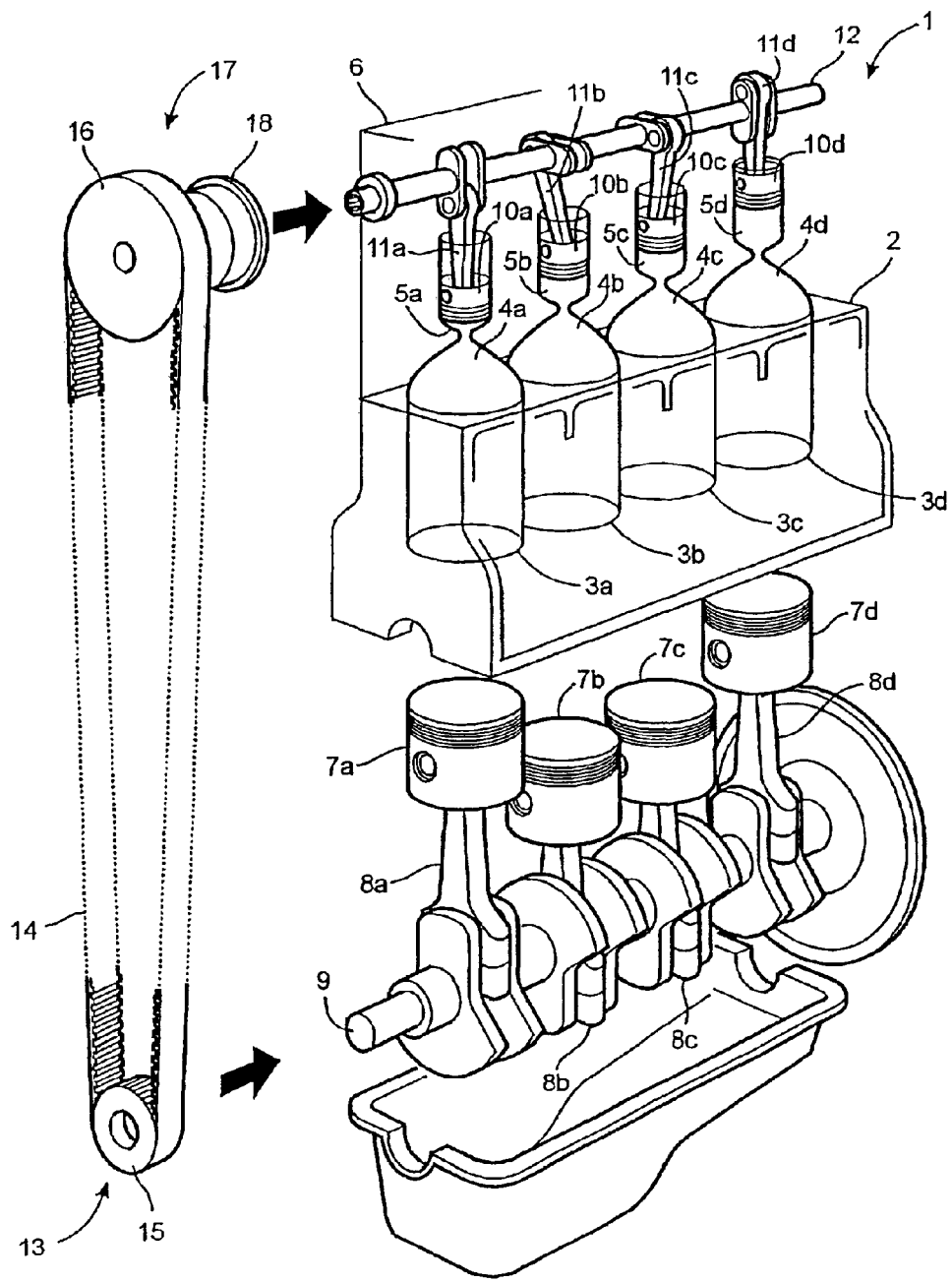
FIG. 1 shows a perspective view, partially in phantom, a representation of an internal combustion engine provided with a device for controlling a phase angle between crankshafts according to the present invention.

FIG. 1 shows, in a perspective view in partial cross-section, an internal combustion engine 1 with an engine block 2 with primary cylinders 3a, 3b, 3c, 3d that respectively communicate via channels 4a, 4b, 4c, 4d with secondary cylinders 5a, 5b, 5c, 5d arranged in the cylinder head 6 of the internal combustion engine 1. In every primary cylinder, primary pistons 7a, 7b, 7c, 7d are reciprocatingly arranged and by means of primary connecting rods 8a, 8b, 8c, 8d are connected to a first crankshaft 9. In every secondary cylinder 5a, 5b, 5c, 5d, secondary pistons 10a, 10b, 10c, 10d are reciprocatingly arranged and are connected to the second crankshaft 12 by means of secondary connecting rods 11a, 11b, 11c, 11d. The first crankshaft 9 is mounted in bearings in the engine block 2, and the second crankshaft 12 is mounted in bearings in the cylinder head 6. The crankshafts 9, 12 are connected to each other by means of a transmission 13 that includes a cogged driving belt 14 that runs over a first 15 and a second 16 driving wheel. The size of the driving wheels 15, 16 are chosen so that the second crankshaft 12 rotates with half the rpm's of the first crankshaft 9. The second driving wheels 16 partially envelope the housing 18 of the device for phase shift control 17 that is arranged on the cylinder head 6.

Figure 2:
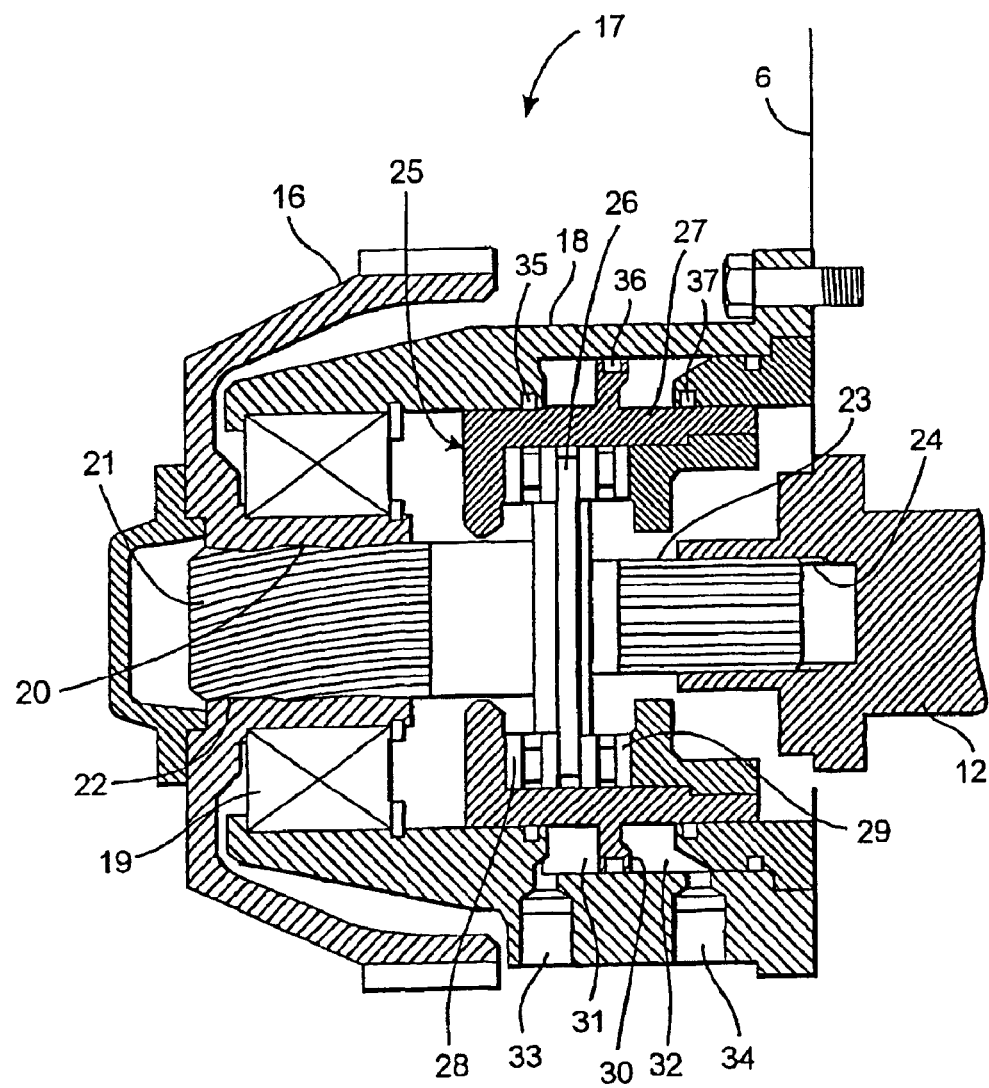
FIG. 2 shows a side elevational view, in partial cross-section, of a preferred embodiment of a device for regulating such a phase angle between crankshafts.

With reference to FIG. 2, a preferred embodiment of the means or device for phase shift control 17 will now be described. In the embodiment shown, the second driving wheel 16 is mounted in the housing 18 by means of ball bearings 19, preferably an angle contact layer with double rows. The driving wheel 16 is in addition equipped with a grooved portion 20, that interacts with the corresponding grooved portion 22 on a crankshaft extension 21. The grooved portions 20, 22 are equipped with grooves of the trapeze groove kind with twelve inlets which afford a shift in angle of 120 degrees at 20 mm axial displacement of the crankshaft extension 21. The crankshaft extension 21 in addition exhibits a portion equipped with splines 23 which cooperate with a corresponding portion 24 equipped with splines on the second crankshaft 12 for the connection which is displaceable and fixed against rotation. The axis of rotation of the crankshaft extension 21 thus coincides with the axis of rotation of the second crankshaft 12.

The crankshaft extension 21 is preferably made of steel and is, at the grooved portion 22 and the portion 23, equipped with splines, covered with a layer consisting of chemically deposited nickel, and which has been impregnated and surface coated with a fluoral plastic and thermically hardened. In this way, low friction is obtained, which means that reduced forces will be necessary for the phase shift control. Coatings of this kind are commercially available under the brand name Nedox®, and have previously been used, as among other things, surface coatings on gear cogs and on molding tools for plastic products with small trailing angles.

The device 17 additionally includes means or mechanism 25 for accomplishing displacement of the crankshaft extension 21. For this purpose, the crankshaft extension 21 is thus provided with a flange 26 between the grooved portion 22 and the spline equipped portion 23, and upon which a hydraulic piston 27, that is displaceably arranged in the housing 18, is configured to work. Between the flange 26 and the hydraulic piston 27, bearings 28, 29 of the needle type are arranged, and which are configured to absorb axial forces that will arise as a result of the torque transferred over the grooved portions 20, 22. Since the hydraulic piston 27 is arranged to surround the crankshaft extension 21, the arrangement 17 will become compact and short in the axial direction, which is extremely advantageous in motor vehicles.

In addition, the hydraulic piston 27, on its enveloping surface, exhibits an abutment 30 that divides a chamber into a first 31 and a second 32 subchamber, and each of which communicate with a first 33 and a second 34 oil conduit, respectively. The oil conduits 33, 34 are connected to an hydraulic control valve which, depending on a control system of the engine 1, controls the oil supply to one or the other sub-chamber 31, 32, and in so doing causes a phase angle shift between the first 9 and second 12 crankshafts. By using part of the oil that is normally pressurized by a servo control pump at the engine 1, there is no need for an extra oil pump.

The housing 18 is additionally provided with o-rings 35, 36, which are arranged to be in contact with the piston 27, one on each side of the abutment 30, and to function as oil sealings for the sub-chambers 31, 32. On the outer perimeter of the abutment 30, a corresponding o-ring for oil sealing is arranged between the first 31 and second 32 sub-chamber. Since the crankshaft extension 21 is connected to the piston 27 via the bearings 28, 29, there is, at least in principle, no torque transferred to the piston 27 when the crankshaft extension 21 rotates. As a result, the piston 27, due to friction between it and the o-rings 35, 36, 37, will not rotate with the crankshaft extension 21 when it rotates, which simplifies the oil sealing.

According to what has been described above, the function of the device 17 is as follows: a supply of oil through the conduit 33 to the sub-chamber 31 results in a build-up of pressure in the sub-chamber 31, whose volume is limited by the abutment 30 arranged on the piston 27. This in turn causes the piston 27 to be pressed in the direction of the cylinder head 6. Since the crankshaft extension 21, via the bearings 28, 29, is connected to the piston 27, a relative axial displacement in the spline coupling 23, 24 between the crankshaft extension 21 and the crankshaft 12 thus results. At the same time, there is a corresponding relative axial displacement between the crankshaft extension 21 and the second driving wheel 16, while the driving wheel 16 rotates in the trapeze grooves 20, 22, which causes a phase angle shift between the first 9 and the second 12 crankshaft. In a corresponding manner, a shift in phase angle in the opposite direction is obtained by supplying oil through the conduit 34 to the sub-chamber 32.

The invention is not limited to that which has been described above; it should be appreciated that other embodiments are also possible. For example, an electrical engine instead of the hydraulic piston can be arranged to influence the flange of the crankshaft extension. Displacement of the crankshaft extension can also take place against a coil, for example a spiral coil, with the hydraulic piston or electrical engine only being arranged to cause displacement in one direction. According to an alternative embodiment, the crankshaft extension is arranged in the opposite direction, so that the spline coupling can be arranged at the second driving wheel, and the trapeze groove is arranged between the crankshaft extension and the second crankshaft. In yet another alternative embodiment, the device for control of phase angle, in contrast to the embodiment above described, is arranged at the first crankshaft. Finally, the crankshaft extension can, instead of using splines, be equipped with another cross-section, for example a square cross-section which interacts with a corresponding square hole on the crankshaft for obtaining the displaceable connection which is fixed against rotation.

What is claimed is:

1. A device for manipulating the phase angle between two crankshafts of an internal combustion engine, said device comprising:

an extending and retracting member adapted to be connectable upon one of two crankshafts of an internal combustion engine, said extending and retracting member configured to alter a phase angle between the two crankshafts of an including internal combustion engine upon either extension or retraction of said member and wherein said extending and retracting member further comprises an hydraulically operated piston adapted for extending said extending and retracting member.

2. The device according to claim 1, wherein said hydraulically operated piston of said extending and retracting is further adapted for retracting said extending and retracting member.

3. The device according to claim 1, further comprising:

said two crankshafts comprising a first and a second crankshaft of an internal combustion engine, said internal combustion engine comprising at least one primary cylinder which communicates with at least one secondary cylinder, in each primary cylinder there being movingly arranged a primary piston which is connected to the first crankshaft, and in every secondary cylinder there being movingly arranged a secondary piston which is connected to the second crankshaft, with said first and second crankshaft being connected to each other by means of a transmission, means for obtaining the phase shift control, and a crankshaft extension intended for said phase angle control, which is fixedly connected against rotation to one of said crankshafts and rotationally attached to the second of said crankshafts and further comprising said hydraulic piston arranged in a housing and to surround the crankshaft extension.

4. The device according to claim 3, wherein said hydraulic piston is arranged for obtaining axial displacement of the crankshaft extension in a first direction and in a second direction.

5. The device according to claim 3, wherein said hydraulic piston is arranged rotationally fixed relative to said housing.

6. The device according to claim 3, wherein said crankshaft extension exhibits a first portion equipped with splines for said connection fixed against rotation.

7. The device according to claim 6, wherein first portion is arranged to admit said axial displacement.

8. The device according to claim 3, wherein said crankshaft extension exhibits a second portion equipped with grooves for said rotational connection.

9. The device according to claim 3, wherein said crankshaft extension exhibits a flange between said first and second portions with the hydraulic piston being arranged to affect said flange.

10. The device according to claim 1, wherein said extending and retracting member further comprises a portion adapted to connect said extending and retracting member upon said one of two crankshafts of the internal combustion engine for rotation therewith, and fixed against rotation relative thereto.

* * * * *